United States Patent [19]

Descroix et al.

[11] Patent Number: 4,820,598
[45] Date of Patent: Apr. 11, 1989

[54] ACTIVATABLE BATTERY USING THE LI/SOCL$_2$ OR LI/SO$_2$CL$_2$ COUPLES

[75] Inventors: Jean-Pierre Descroix, Fontenay Sous Bois; Yannick Leben, Bobigny, both of France

[73] Assignee: SAFT, S.A., Romainville, France

[21] Appl. No.: 178,923

[22] Filed: Apr. 7, 1988

[30] Foreign Application Priority Data

Apr. 13, 1987 [FR] France ................... 87 05203

[51] Int. Cl.$^4$ ............................................. H01M 6/38
[52] U.S. Cl. .................................. 429/62; 429/64; 429/70; 429/115; 429/116
[58] Field of Search ............... 429/52, 62, 63, 64, 429/70, 113, 114, 116

[56] References Cited

U.S. PATENT DOCUMENTS

| | | | |
|---|---|---|---|
| 3,713,413 | 1/1973 | Nakamura | 114/20 R |
| 4,200,684 | 4/1980 | Bro | 429/51 |
| 4,435,487 | 3/1984 | Spuelak et al. | 429/70 |
| 4,490,443 | 12/1984 | Ruch et al. | 429/70 |

FOREIGN PATENT DOCUMENTS 2270685 12/1975 France .
8402428 6/1984 World Int. Prop. O. .

Primary Examiner—Donald L. Walton
Attorney, Agent, or Firm—Kenyon & Kenyon

[57] ABSTRACT

A battery in accordance with the invention comprises: p1 an electrochemical block (3) constituted by a large number of electrochemical couples; p1 a network for irrigating said electrochemical couples with electrolyte; p1 a heat exchanger (7) for externally dumping the heat evolved during discharge; p1 a pump (5) for causing the electrolyte (10) to circulate through the irrigation network and said heat exchanger; and p1 a device (2) for storing electrolyte and transferring it to said electrochemical block (3) on activation, said device including a supply of electrolyte connected to a gas generator and also to an inlet to said pump.

6 Claims, 3 Drawing Sheets

ACTIVATABLE BATTERY USING THE LI/SOCL₂ OR LI/SO₂CL₂ COUPLES

The present invention relates to an activatable battery using Li/SOCl₂ or Li/SO₂Cl₂ couples, and intended, in particular for propelling underwater vehicles.

BACKGROUND OF THE INVENTION

In outline, such a battery comprises:

an electrochemical block constituted by a large number of electrochemical couples;

a network for irrigating said electrochemical couples with electrolyte;

a heat exchanger for externally dumping the heat generated during discharge;

a pump for ensuring that the electrolyte flows round the irrigation network and said heat exchanger; and a device for storing electrolyte and transferring it to said electrochemical block when the battery is activated, said device including an electrolyte tank which is connected both to a gas generator and to an inlet to said pump.

A problem encountered when such a battery operates is the feed to the pump when the battery propelled vehicle is subjected to a steep inclination of the order of 45° in order to change the depth at which the vehicle is immersed. Pump feed must also be ensured regardless of variations in the volume of the electrolyte in the electrochemical block during discharge, which variations may be due, for example, to variations in temperature and to variations in molar volumes.

The object of the present invention is to provide an activatable battery using Li/SOCl₂ or Li/SO₂Cl₂ couples and whose structure enables the above problem to be solved.

SUMMARY OF THE INVENTION

The present invention provides an activatable battery using the Li/SOCl₂ or Li/SO₂Cl₂ couples, and comprising:

an electrochemical block comprising a large number of couples;

a network for irrigating the couples in said block;

a heat exchanger;

a pump for causing electrolyte to circulate through said network and said heat exchanger; and a device for storing electrolyte and transferring it to said block, said device including a supply of electrolyte which is connected firstly to a gas generator and secondly to the inlet of the circulation pump;

wherein said gas generator is connected to the top portion of said electrolyte supply, and the supply is split into two compartments, a main compartment connected to said gas generator and a "buffer" compartment connected to said pump, said buffer compartment being separated from said main compartment by a non-electrolyte-proof partition provided at its top with a dip tube ending in the bottom portion of said main compartment.

In one improvement for providing greater activation security, said gas generator associated with a pyrotechnical punch for opening it is connected to said main compartment via a controllable valve whose output connected to said compartment includes a burstable membrane and which is provided with another outlet leading to the outside of the battery.

In another improvement also for providing greater security, said "buffer" compartment is connected to the inlet of said pump via a duct including a capsule associated with a pyrotechnical punch, said capsule being followed by a burstable membrane.

In order to ensure uniform irrigation of all of the couples in said block regardless of the position of the battery, the quantity of electrolyte contained in said electrolyte tank prior to activation is such that after activation there remains a sufficient quantity of electrolyte in the "buffer" compartment to ensure that said pump is always primed.

In addition, the volume of gas contained in said gas generator is such that after activation, the pressure in said electrolyte tank is a few bars.

Preferably, a thermostatic valve is provided comprising at least one inlet for hot electrolyte leaving the electrochemical block and at least one inlet for cold electrolyte leaving said heat exchanger, with the outlet from said valve being connected to the inlet of said electrochemical block.

BRIEF DESCRIPTION OF THE DRAWINGS

An embodiment of the invention is described by way of example with reference to the accompanying drawings, in which.

MORE DETAILED DESCRIPTION

Figure 1:
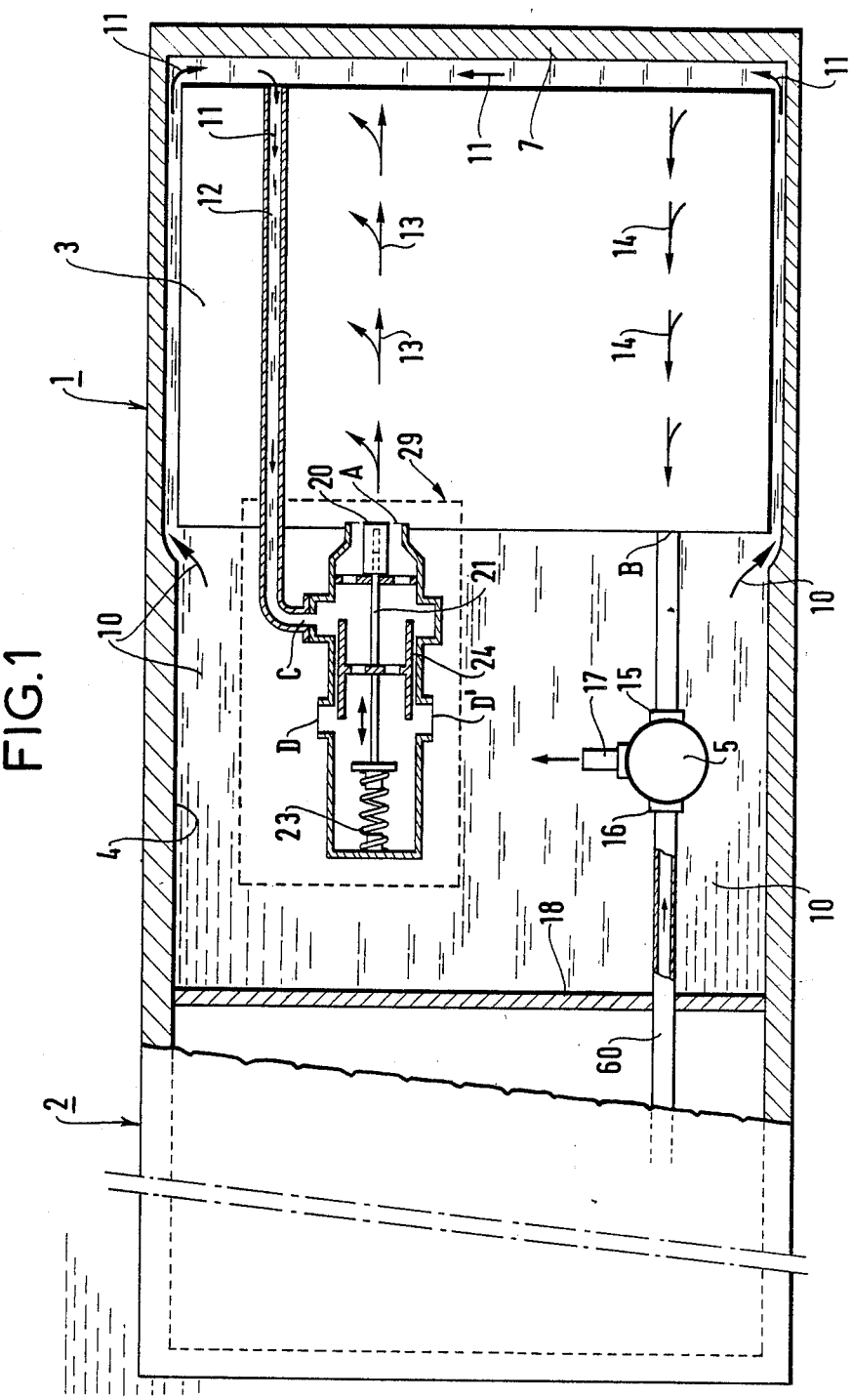
FIG. 1 is a diagrammatic section through a battery assembly in accordance with the invention.

FIG. 1 shows a battery in accordance with the invention comprising an assembly 1 containing an electrochemical block 3 per se and a device 2 for storing and transferring electrolyte into the block 3. In order to clarify the description, the assembly shown in FIG. 1 is shown after electrolyte 10 has been transferred via duct 60, i.e. during battery discharge.

The battery assembly is housed in a metal housing 4. The electrochemical block 3 comprises a stack of electrochemical couples and it includes a network for irrigating these couples with electrolyte 10, said electrolyte entering the block via inlet A and leaving via outlet B, and a pump 5 ensuring that it flows. The pump 5 has two inlets 15 and 16 and an outlet 17.

By way of example, each electrochemical couple may comprise:

a porous cathode made of 0.35 mm thick carbon;

a 0.15 mm thick lithium anode;

0.05 mm thick nickel current collectors; and a 0.20 mm thick separator.

The temperature of the electrolyte entering the electrochemical block at A is regulated by means of a heat exchanger and a thermostatic valve 29. The electrolyte 10 put into circulation by the pump 5 passes around the block 3 against the wall 7 of the housing 4 which is in contact with the outside medium, generally the sea. At this level, the electrolyte 10 is cooled and the cold electrolyte referenced 11 reaches an inlet C to the thermostatic valve 29 via a duct 12. The valve has other inlets D and D' for hot electrolyte 10. It is provided with a thermostatic capsule 20 and with a moving rod 21 which co-operates together with a return spring 23 with a piston 24. The piston 24 is suitable for closing the inlet D, D', and C to a greater or a lesser extent.

Depending on the regulation temperature, the mixture of hot electrolyte and cold electrolyte at the inlet A of the electrochemical block 3 changes. Arrows 13 diagrammatically represent the paths of the electrolyte as it enters the couples in order to irrigate them, whereas arrows 14 represent the outlet paths of the electrolyte.

In an improvement, not shown, the power of the pump 5 is regulated as a function of the temperature of the electrolyte 10 or as a function of the difference between the temperature of the electrolyte 10 and of the electrolyte 11.

The stage of activating the battery and the device 2 for storing electrolyte and transferring it to the assembly 1 is now described. Said device 2 is separated from the assembly 1 by a partition 18.

Figure 2:
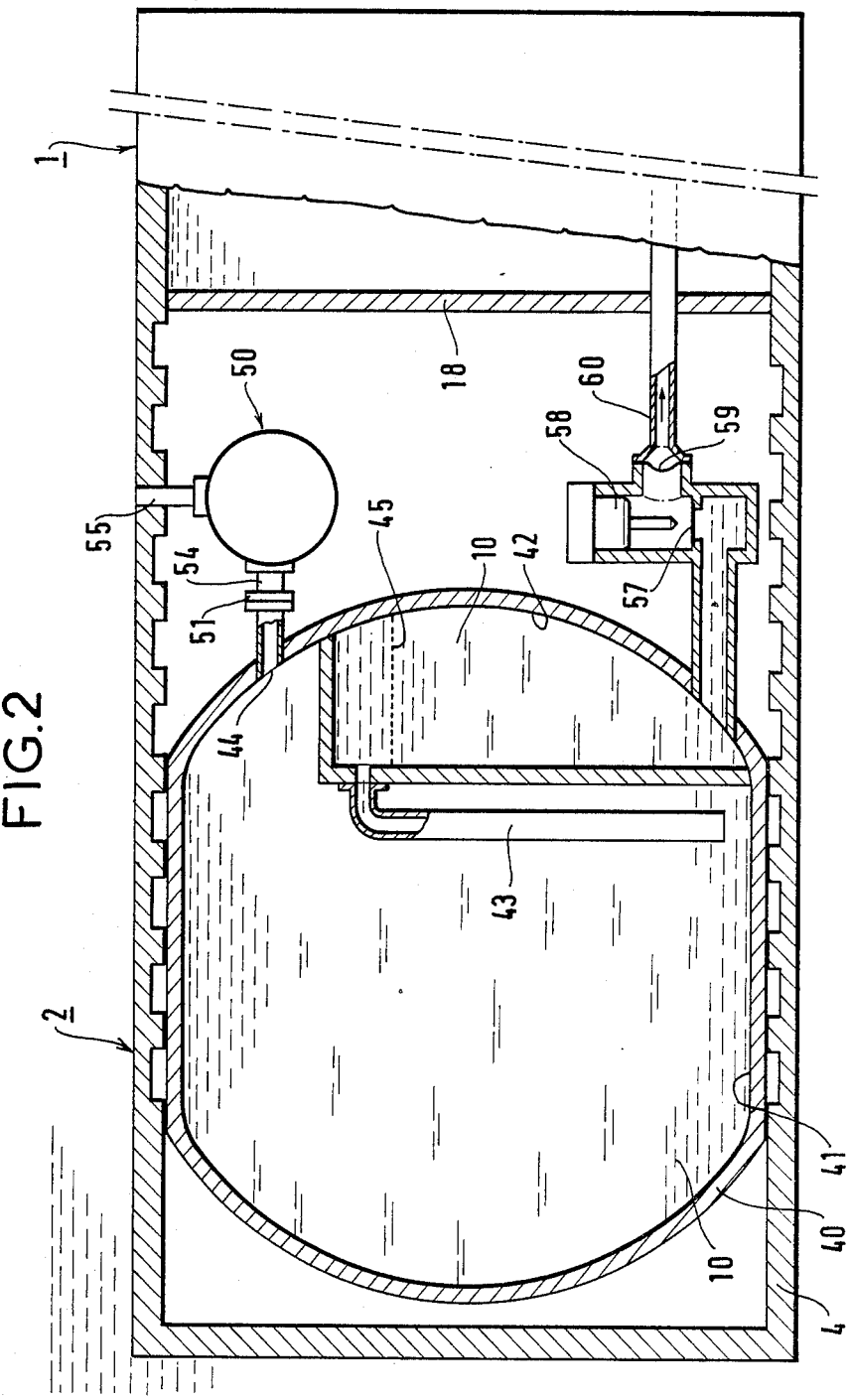
FIG. 2 is a diagrammatic section through the electrolyte tank and the system for activating the battery in accordance with the invention.

FIG. 2 shows an electrolyte tank constituted by a stainless steel cylinder 40 which is about 1 mm thick. It comprises a main compartment 41 and a buffer compartment 42 which is provided at the top with a dip tube 43 leading to the bottom portion of the compartment 42. While the battery is in storage, both compartments are completely filled with electrolyte 10. FIG. 2 shows an example of the filling level (dotted lines referenced 45) in the compartment 42 after activation and during battery discharge.

Figure 3:
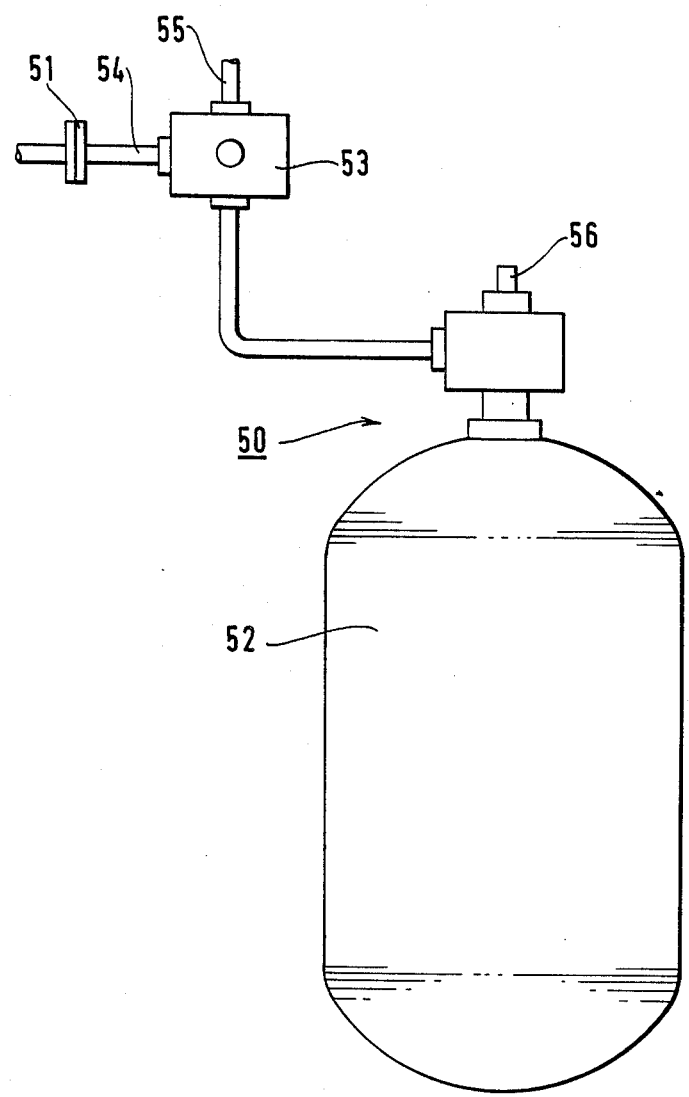
FIG. 3 is a diagram of the gas generator which appears in FIG. 2.

A gas generator shown symbolically by box 50 and in greater detail in FIG. 3, is connected to the top portion 44 of the main compartment 41 via a burstable membrane 51. FIG. 3 shows that the gas generator 50 comprises a gas cylinder per se 52 connected to a controllable safety valve 53 which has an outlet 54 towards the burstable membrane 51 and the compartment 41, and which also has safety outlet 55 leading away from the battery. The gas cylinder 52 is opened by a pyrotechnical punch 56.

The volume of gas contained in the cylinder is sufficient to maintain a residual pressure in the compartment 41, e.g. of about 6 bars, after the electrolyte has been transferred into the electrochemical block 3.

The electrolyte cylinder 40 must be completely leakproof throughout the period during which the battery is stored. Its bottom portion is closed by a stainless steel capsule 57 associated with a pyrotechnical punch 58. Access via duct 60 to the electrochemical block is closed by a burstable membrane 59. This provides an additional safety barrier.

When activated, after the valve 53 has been properly positioned, the pyrotechnical punches 56 and 58 are operated and the membranes 51, 57, and 59 open with the electrolyte as flushed out by the gas from the generator priming the pump 5 which empties the compartment 41 and ensures that electrolyte flows through the electrochemical block 3. When the battery is at a steep slope within its external medium, for example at an angle of about 45°, and regardless of its state of discharge, there always remains sufficient electrolyte in the "buffer" compartment 42 to ensure that the pump 5 is continuously primed.

For example, for a total electrolyte volume of 80 liters, the volume of the buffer compartment is about 15 liters and the volume of the electrolyte remaining in said compartment during discharge is about 5 liters.

During battery discharge, the electrolyte may flow through the block at a rate of about 6 liters per second.

The average temperature of the electrolyte at inlet A to the block is about 40° C.

The power delivered by the battery is about 300 Kwatts.

Naturally this embodiment has been described purely by way of example. Without going beyond the scope of the invention any of the means described could be replaced by equivalent means.

We claim:

1. An activatable battery using the $Li/SOCl_2$ or $Li/SO_2Cl_2$ couples, and comprising:
   an electrochemical block comprising a large number of couples;
   a network for irrigating the couples in said block;
   a heat exchanger;
   a pump for causing electrolyte to circulate through said network and said heat exchanger; and
   a device for storing electrolyte and transferring it to said block, said device including a supply of electrolyte which is connected firstly to a gas generator and secondly to the inlet of the circulation pump;
   wherein said gas generator is connected to the top portion of said electrolyte supply, and the supply is split into two compartments, a main compartment connected to said gas generator and a "buffer" compartment connected to said pump, said buffer compartment being separated from said main compartment by a non-electrolyte-proof partition provided at its top with a dip tube ending in the bottom portion of said main compartment.

2. An activatable battery according to claim 1, wherein said gas generator associated with a pyrotechnical punch for opening it is connected to said main compartment via a controllable valve whose output connected to said compartment includes a burstable membrane and which is provided with another outlet leading to the outside of the battery.

3. An activatable battery according to claim 1, wherein said "buffer" compartment is connected to the inlet of said pump via a duct including a capsule associated with a pyrotechnical punch, said capsule being followed by a burstable membrane.

4. An activatable battery according to claim 1, wherein the quantity of electrolyte contained prior to activation in said electrolyte supply is such that after activation there remains a sufficient quantity of electrolyte in said "buffer" compartment to ensure that the pump is always primed.

5. An activatable battery according to claim 1, wherein the volume of gas contained in said gas generator is such that after activation, the pressure in said electrolyte supply is a few bars.

6. An activatable battery according to claim 1, and provided with a thermostatic valve including at least one inlet for hot electrolyte leaving the electrochemical block and at least one inlet for cold electrolyte leaving said heat exchanger, with the outlet from said valve being connected to the inlet of said electrochemical block.

* * * * *